United States Patent
Yamamoto

(10) Patent No.: US 8,053,382 B2
(45) Date of Patent: Nov. 8, 2011

(54) OPTICAL GLASS

(75) Inventor: Hiroki Yamamoto, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 306 days.

(21) Appl. No.: 12/244,085

(22) Filed: Oct. 2, 2008

(65) Prior Publication Data

US 2009/0093356 A1    Apr. 9, 2009

(30) Foreign Application Priority Data

Oct. 2, 2007  (JP) ................. 2007-258215
Jul. 31, 2008  (JP) ................. 2008-197174

(51) Int. Cl.
  *C03C 10/02*  (2006.01)
  *C03C 10/00*  (2006.01)
  *C03C 3/00*  (2006.01)
  *B32B 9/00*  (2006.01)
  *B32B 17/06*  (2006.01)

(52) U.S. Cl. ................. 501/10; 501/2; 501/12; 428/428

(58) Field of Classification Search .................. 501/2, 4, 501/5, 10, 12, 32; 428/428, 429
See application file for complete search history.

(56) References Cited

U.S. PATENT DOCUMENTS

| | | | |
|---|---|---|---|
| 4,564,556 A | 1/1986 | Lange | |
| 5,561,089 A * | 10/1996 | Ishizaki et al. | 501/10 |
| 6,248,678 B1 * | 6/2001 | Pinckney | 501/10 |
| 6,503,857 B2 * | 1/2003 | Nakajima et al. | 501/10 |
| 2003/0232149 A1 * | 12/2003 | Oswald et al. | 427/453 |
| 2005/0119105 A1 * | 6/2005 | Zimmer et al. | 501/32 |
| 2007/0093375 A1 * | 4/2007 | Nakajima | 501/4 |

FOREIGN PATENT DOCUMENTS

| | | | |
|---|---|---|---|
| JP | 61-086703 | | 5/1986 |
| JP | 05-058650 | | 3/1993 |
| JP | 06-157045 | | 6/1994 |
| JP | H06-157045 A | * | 6/1994 |
| JP | 2007-070603 | | 3/2007 |

* cited by examiner

*Primary Examiner* — Jerry A Lorengo
*Assistant Examiner* — Noah Wiese
(74) *Attorney, Agent, or Firm* — Antonelli, Terry, Stout & Kraus, LLP.

(57) ABSTRACT

Optical glass constituted by an amorphous matrix and crystal grains dispersed in the amorphous matrix, wherein the amorphous matrix comprises a first oxide of at least one of silicon oxide and phosphor oxide and a second oxide of at least one of titanium oxide and zirconium oxide, and wherein the crystal grains is at least one of titanium oxide, zirconium oxide and silicon, an average grain size of the titanium oxide grain being 3 nm to 20 nm, and the average grain size of the silicon crystal being 3 nm to 8 nm.

12 Claims, 3 Drawing Sheets

OPTICAL GLASS

CLAIM OF PRIORITY

The present application claims priority from Japanese patent application serial No. 2007-258215, filed on Oct. 2, 2007 and serial No. 2008-197174, filed on Jul. 31, 2008, the contents of which are hereby incorporated by reference into this application.

FIELD OF THE INVENTION

The present invention relates to optical glass with a high reflection rate.

RELATED ART

In recent years, camera functions for taking precise digital pictures are installed in portable digital home appliances such as phones, digital cameras, etc. As a means for optically catching objects, small lens units, called micro-lens are installed therein. Based on demands on downsizing and thinning of the portable home appliances, small sized micro-lens units have been required. In order to meet the demands optical glass material for constituting the optical lens needs high refraction rate.

Heretofore, large amounts of heavy metal oxides such as lead, bismuth, lanthanum, barium, etc have been added to the glass material to increase a density of the glass composition thereby to achieve the high refraction rate. However, when these heavy metal are added, a specific gravity of the glass increases and a weight per unit volume increases. As a result, a consumption electric power for driving an auto-focussing mechanism of lens increases and control of the mechanism becomes difficult.

Further, it is feared that these heavy metals are generally poisonous, and they might affect adversely on environment. In addition, the refraction rate of the glass materials on the market is about 2.1, which is approximately the limit. Accordingly, it is difficult to meet a higher refraction rate.

As a method of eliminating these problems, it is considered to manufacture high refraction rate glass using titanium oxide with a high refraction rate. When titanium oxide is used, a melting temperature in a conventional melting method for manufacturing glass should be extremely as high as 1500 to 2000° C. because a melting point of titanium oxide is very high, which makes the glass manufacturing process difficult. Thus, a process such as a sol-gel process has been studied widely.

For example, patent document No. 1 (Japanese patent laid-open H06-157045) discloses a method of manufacturing rutile type titania-silica glass wherein the glass composition is constituted by rutile type titania that disperses nearly homogeneously in silica glass. The glass composition is capable of being manufactured as a fibrous form, plate form or wire form, as well as a powder form, and coating film. In the method silicone alkoxide, organic titanium compound and water miscible organic solvent are mixed to form a solution; an aqueous solution of acid anhydride solution is added to the solution of the mixture so as to perform hydrolysis. Then, the hydrolysate solution is made mature to obtain gel. The gel is then dried and calcined to produce the rutile type titania-silica glass.

For example, patent document No. 2 (Japanese patent laid-open H05-58650) discloses a composite oxide glass composition comprising 50-96 wt % of $SiO_2$, 3-40 wt % of $TiO_2$ and discloses 1-15 wt % of $B_2O_3$ and a method of the glass by means of a sol-gel method. The glass has a high refraction rate and excellent in mechanical strength and transparency, and further, the glass can be manufactured by calcined at temperatures lower by several hundreds ° C. than calcinations temperatures of the glass.

SUMMARY OF THE INVENTION

In patent document No. 1 since the glass is constituted by amorphous silica and rutile type titania crystals, a difference in refraction rate between the amorphous portion and the crystal portion is great. In case a concentration of titania with high refraction rate is high, the resulting glass becomes milky or milky white, which is not suitable for an optical lens use. On the other hand, in case a concentration of titania is low, it is difficult to obtain high refraction rate glass, though it is nearly transparent and can be applied to optical glass.

In patent document No. 2 $B_2O_3$ is added in order to suppress crystallization of the glass, to keep transparency, but it is difficult to obtain a high refraction rate because the glass is made amorphous as a whole by suppressing precipitation of rutile type and anatase type titania. In addition since $B_2O_3$ is an element that lowers refraction rate of glass, it is difficult to produce optical glass that contains $B_2O_3$ with high refraction rate.

An object of the present invention is to provide glass that has a high refraction rate and is capable of being used for optical use, and microlens using the glass.

In order to achieve the object of the present invention, the optical glass of the present invention is featured by comprising an amorphous matrix and crystal grains dispersed in the amorphous matrix, wherein the amorphous contains a main ingredient comprising a first oxide selected from the group consisting of silicon oxide and phosphor oxide and a second oxide selected from the group consisting of titanium oxide and zirconium oxide, and the crystal grains are selected from the group consisting of titanium oxide, zirconium oxide and silicon, an average grain size of the crystal grains being 3 nm to 20 nm in case of titanium oxide, and 3 nm to 8 nm in case of silicon. According to the above glass structure, transparent glass with high refraction rate is obtained.

Particularly, the first oxide should preferably be silicon oxide, the second oxide should preferably be titanium oxide and the crystal grains should preferably be titanium oxide or silicon single crystal. In this case, a content of the titanium oxide in the amorphous matrix should preferably be 30 to 80 mol % based on a conversion as $TiO_2$. In case of silicon, a content of titanium oxide crystal grains should preferably be 1 to 60 mol % based on a conversion as $TiO_2$ oxide and a content of silicon crystal grains should preferably be 1 to 40 mol %, per the whole weight of the optical glass.

A method of manufacturing optical glass for achieving the above object of the present invention comprising:

performing hydrolysis of silicon alkoxide in a silicon alkoxide solution;

adding an alcohol solution of titanium alkoxide to the hydrolyzed solution to obtain a solution;

adding titanium grains dispersed in alcohol to the solution;

adding water to the mixture to effect hydrolysis and gelation of the silicon alkoxide and titanium alkoxide; and drying gel.

The drying process for the gel comprises a step for holding the gel at 20 to 30° C. for at least 24 hours, thereafter elevating temperature to 50 to 70° C. at a elevating rate of 0.1 to 0.2° C., and holding the gel at the elevated temperature for at least one hour.

Further, the optical glass according to the present invention comprises an amorphous matrix and crystal grains dispersed in the amorphous matrix, wherein the amorphous matrix contains as a main ingredient at least one of silicon oxide and phosphor oxide, and at least one of titanium oxide and zirconium oxide, and the crystal grains comprise cores of silicon having an average grain size of 3 nm to 8 nm and shells formed on the silicon grains, and a concentration of oxygen in the shell increases from the center of the grains to peripheries.

Further, the optical glass according to the present invention comprises an amorphous matrix and crystal grains dispersed in the amorphous matrix, wherein the amorphous matrix contains as a main ingredient at least silicon oxide and titanium oxide, and the silicon oxide has at least one organic side chain coordinate to the silicon oxide.

Still further, the optical glass according to the present invention comprises an amorphous matrix and crystal grains dispersed in the amorphous matrix, wherein the amorphous matrix contains as main ingredients at least silicon oxide and titanium oxide, one or more of organic side chains are coordinated to the silicon oxide, and each of the crystal grains comprises a core of silicon having an average grain size of 3 nm to 8 nm and a shell of silicon oxide formed around the core, a concentration of oxygen in the shell having such a gradient that the concentration of oxygen becomes higher as goes from the center to outward. The organic side chain may be an alkyl group, phenyl group or amino-alkyl group.

A content of titanium oxide in the matrix 30 mol % to 95 mol % on the basis of a conversion to $TiO_2$, and the crystal grains are contained in the optical glass in an amount of 1 mol % to 60 mol % on the basis of a conversion to oxides.

A method of manufacturing the optical glass of the present invention comprises a step of subjecting an alcohol solution of silicon alkoxide to hydrolysis; a step of adding an alcohol solution of titanium alkoxide to the hydrolyzed silicon alkoxide solution; a step of adding silicon crystal grains to the solution containing silicon and titanium; a step of subjecting the solution containing the added silicon crystal grains to gelation; a step of drying the gelled solution; and a step of calcinating the dried gel to form a shell on the surface of the silicon grain, the shell having a concentration gradient that becomes higher as it goes outward from the center inner side to the outer side of the shell.

According to examples of the present invention, it is possible to produce optical glass with high refraction rate, keeping high transparency. Further, when the optical glass of the present invention is applied to optical lens, it is possible to downsize the lens and to make the lens thin and light-weighted so that the optical lens can be applied to more downsized equipments.

DETAILED DESCRIPTION OF PREFERRED EMBODIMENTS

Figure 1:
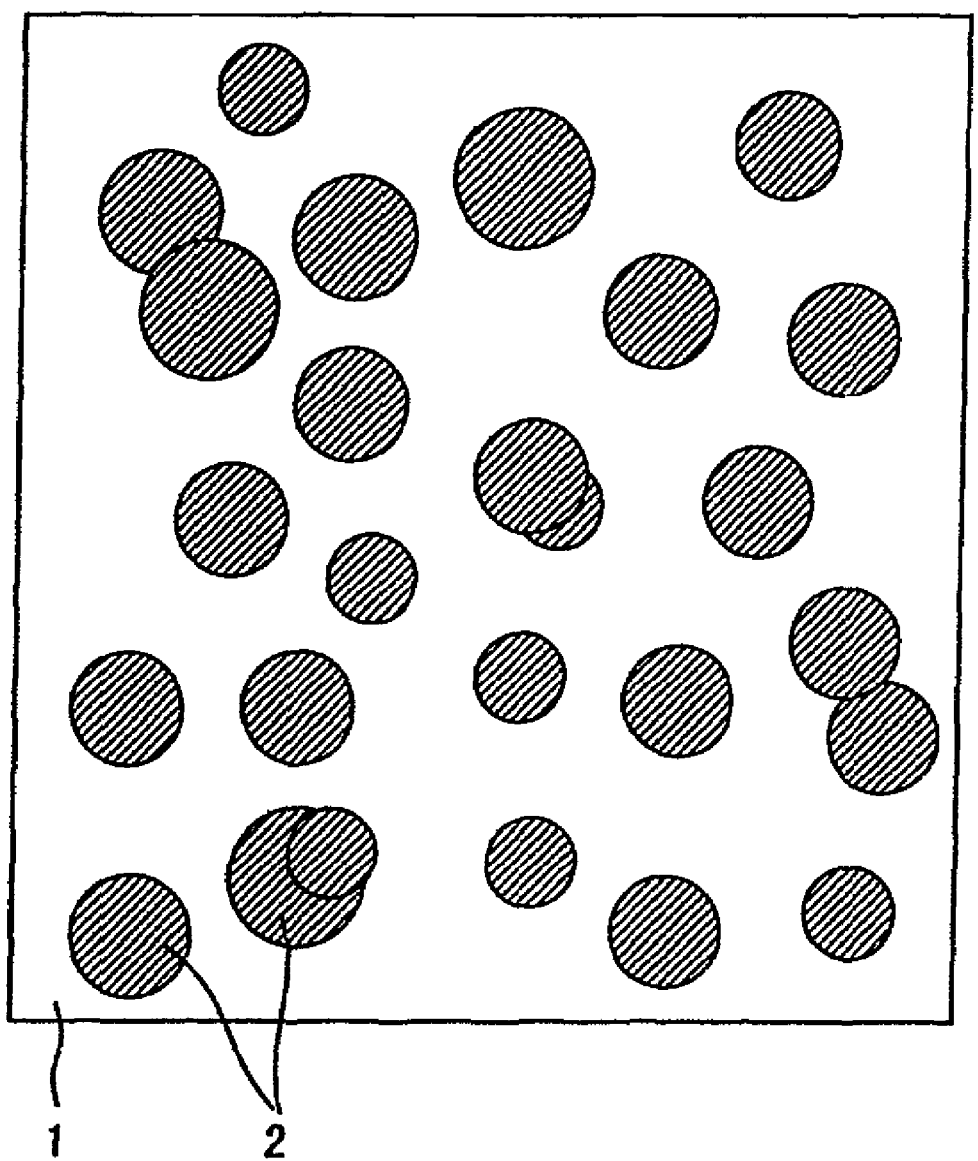
FIG. 1 is a diagrammatic plan view of optical glass of an example of the present invention.

In the following there are explained methods of manufacturing optical glass with high refraction rates of the present invention and optical characteristics of the optical glass.

When a matrix portion is made from an amorphous state of silicon oxide and titanium oxide and titanium oxide crystal grains of titanium oxide such as anatase type or rutile type titanium oxide (an average grain size is 3 nm to 20 nm) or silicon crystal are dispersed in the matrix, the optical glass having transparent and high refraction rate is obtained. When the amorphous matrix portion is made from silicon oxide and titanium oxide, the refraction rate thereof becomes large so that an amount of titanium oxide can be restricted.

Since the refraction rates of silicon oxide crystal and titanium oxide are close to that of the matrix portion, transformation of the optical glass into white milky or white color by light scattering due to difference in refraction rates is suppressed, and transparency is improved. Further, since the refraction rate of the matrix portion is high, it is possible to increase the refraction rate of the optical glass as a whole.

Since only the materials including silicon oxide, titanium oxide, etc, which are vary safe materials, are used, load on environment will be relieved. When a content of titanium oxide crystal grains is 10 mol % to 60 mol % per the optical glass on the basis of a conversion to $TiO_2$, and when the average grain size of the crystal grains is 5 nm to 20 nm, optical glass with a higher refraction rate is obtained.

The optical glass can easily be manufactured by a sol-gel method at low temperatures. After a silicon alkoxide compound is dissolved in alcohol and the compound solution to which water in an amount of equivalent to the compound is added is subjected to hydrolysis, an equivalent amount of titanium alkoxide is added thereto. By sufficiently stirring the solution, a network of silicon oxide-titanium oxide is constituted. After that, when crystal grains of titanium oxide dispersed in alcohol are added to the network, milky sol is formed. Then, aqueous alcohol solution is added under vigorous stirring to the milky sol. When the silicon compound and titanium compound that remain as unreacted components are subjected to complete hydrolysis, a glass raw material wherein crystal grains are dispersed in the silicon oxide-titanium oxide matrix is obtained. Since the glass raw material has flowability, it can be cast in a mold to obtain swollen gel having a desired shape.

When the swollen gel is dried slowly, alcohol and water vaporize to form a silicon oxide and titanium oxide matrix. By the drying step, a refraction rate of the amorphous matrix becomes gradually high. The drying step lowers mismatching of the refraction rate between the matrix portion and the crystal grains to increase transparency of the glass. According to the above manufacturing method, it is possible to stably manufacture the optical glass with high refraction rate at temperature as low as 100° C., keeping high transparency.

When silicon is selected as the crystal nano-gains to be contained in the optical glass, it is possible to form a shell structure on the silicon crystal grains, the shell having a gradient of oxygen concentration can be formed by thermal oxidation. Although ordinary silicon oxide nano-grains are coarse because of aggregation, light scattering or light absorption takes place. When the surface of the grains is subjected to oxidation treatment, the grain size of the core grains can be made small and a light loss by light scattering can be lowered.

When a part of bonds of silicon contained in the amorphous matrix of the optical glass is organic side chains such as alkyl group, phenyl group or amino-alkyl group, cracks, etc will be remarkably reduced.

When the above-described optical glass is employed to backlights of liquid displays or a light emitting port of LED's, a full refraction by a cover glass after light emitting is restricted and a utilization efficiency of light is remarkably increased.

Further, since the optical glass of the present invention that has a high refraction rate can be applied to wiring on a substrate, it can be used as a core of light wave-guides.

Example 1

In Example 1 explained is a sol-gel method for manufacturing optical glass wherein titanium oxide crystal grains were dispersed in a matrix composed of silicon oxide and titanium oxide. In this example the optical glass was prepared by the sol-gel method.

As a silicon oxide raw material for silicon alkoxide used was ethoxide silicon ($Si(OC_2H_5)_4$). As a silicon oxide raw material for silicon alkoxide used was silicon ethoxide ($Si(OC_2H_5)_4$). There are other silicon alkoxides such as methoxide silicon, silicon normal propoxide, isopropoxide silicon, silicon normal butoxide, silicon isobutoxide, silicon secondary butoxide, silicon tertiary butoxide, etc. These compounds are used singly or in combinations.

As a titanium oxide raw material for titanium alkoxide used was normal butoxide titanium ($Ti(OC_4H_9)_4$). As a raw material for titanium oxide, used was titanium normal butoxide ($Ti(OC_4H_9)_4$). There are other compounds are titanium alkoxides such as titanium metoxide, titanium ethoxide, titanium normal butoxide, titanium isopropoxide, titanium secondary butoxide, titanium tertiary butoxide, etc. These are used singly or in combinations. The larger the carbon number of alkoxyl group that coordinates to titanium becomes large, the slower the speed of hydrolysis of the alkoxides becomes. As a result, the control of the hydrolysis becomes easy. On the other hand, however, since the compounds having large a carbon number are difficult to be vaporize, the compounds tend to remain in the gel.

Since the speed of hydrolysis of ethoxide silicon is much more slower than that of normal butoxide titanium compound, it is difficult to obtain transparent gel when a simple mixture of these compounds are mixed with water, because hydrolysis of titanium preferentially takes place to generate milky precipitate. Accordingly, the matrix of silicon oxide-titanium oxide was prepared by the following manner.

At first, to 1 mol of ethoxide silicon dissolved in alcohol added was 1 mol of water. Then, 1 mol of butoxide titanium or isopropoxide titanium was added to the alcohol solution. Under sufficient stirring a silicon oxide-titanium oxide network was constituted.

In order to suppress a quick hydrolysis reaction, 1 mol of silicon ethoxide was dissolved under stirring with a stirrer in 2 mols of ethanol or methanol (solution A). Further, water for hydrolysis was prepared by adding a 1% diluted hydrochloric acid to pure water to adjust its pH value to 2.0 or less (solution B).

The alcohol solution of ethoxide silicon was stirred vigorously, and 1 mol of the pure water whose pH value was adjusted to 2.0 or less was titrated in the ethoxide solution. One group of the four alkoxyl groups was hydrolyzed (solution C). The reaction may be expressed as follows.

$$Si(OEt)_4 + H_2O \rightarrow Si(OH)(OEt)_3 + EtOH \quad \text{(Chemical Equation 1)}$$

In the equation 1 Et represents ethoxy group ($OC_2H_5$). After the solution C was stirred for about 10 minutes, the solution was stood alone for about 10 minutes.

Thereafter, in order to suppress a quick hydrolysis reaction, 1 mol of titanium normal butoxide was dissolved under stirring with a stirrer to the 3 mols of ethanol or methanol (solution D).

To the hydrolyzed solution (solution C) of ethoxide silicon prepared in accordance with equation 1 titrated was an alcohol solution of titanium normal butoxide under vigorous stirring to effect a chemical reaction shown in equation 2 to obtain a solution E.

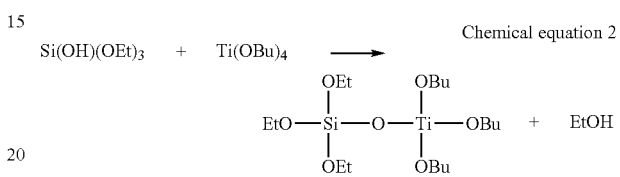

Chemical equation 2

In equation 2 Bu represents butoxyl group ($OC_4H_9$). According to the reaction, Si—O—Ti network is formed. After the resulting solution was stirred for 10 minutes to 1 hour, the solution was stood alone.

Thereafter, as a second step, a methanol solution of rutile type titanium oxide crystal grains (average grain size: 10 nm) was dropped in the above solution. To the solution E dropped was the methanol dispersed sol containing 30 wt % of rutile titanium oxide crystal grains (average grain size: 10 nm) to obtain a solution F. In this example the sol in about 4 wt % of the total weight of the solution was dropped. An amount of titanium oxide crystal grains added to the weight of SiO2-TiO2 was about 10 wt %. Similarly, silicon crystal grains and other crystal grains were added in the similar manners.

For the third step, the residual aqueous alcohol solution was dropped under vigorous stirring to carry out a complete hydrolysis of the unreacted silicon oxide and titanium oxide thereby to produce a silicon oxide-titanium oxide matrix in which rutile type titanium oxide grains were dispersed.

In order to hydrolyze unreacted alkoxyl groups remaining in the solution F, prepared was water for hydrolysis, which contains 4 mols of pure water to which 1% diluted hydrochloric acid was added to adjust pH to 2.0 or less and 1-3 mol of ethanol or methanol (solution G). The solution G was dropped to the solution F under vigorous stirring to advance hydrolysis to obtain solution H. Alcohol remains in the matrix in the sol; since the network of Si—O—Ti is not sufficiently formed, a refraction rate is still low. Therefore, mismatching of refraction rate between the crystal grains and the matrix is great, and color is milky.

For the fourth step, the solution H was charged into a mold, while the solution still has flowability to further advance gelation to produce a desired form. After the resulting swollen gel was dried at room temperature (20 to 25° C.) for 3 days, it was further dried at 70° C. for 3 hours to evaporate alcohol contained in the gel thereby to produce silicon oxide-titanium oxide glass wherein rutile type titanium oxide grains.

The solution H progresses its hydrolysis and gelation rapidly when water is added thereto to solidify and loose flowability. In this step, the solution H was charged into a mold. The molded solution was dried in a closed vessel such as a desiccator at 20 to 30° C. for 24 to 72 hours to obtain dried gel. When the drying of the molded solution at room temperature is conducted in open air, drying of the gel takes rapidly place from the surface thereof, and as a result, cracks in the gel proceeds, which is not preferable. When a proper amount of alcohol vapor exists in a closed vessel, the drying can be carried out without forming cracks.

Thereafter, the dried gel was further dried at 70° C. for 3 hours. A rate of temperature rise from 20 to 30° C. to 70° C. was 0.1 to 0.2° C./minute. The drying temperature was set to 50 to 125° C., which can be adequately varied in accordance with kinds of alcohols, amounts of residual water, etc. When water is completely consumed by hydrolysis, a dense glass body is obtained by drying even at 100° C. or lower. When alcohol having a high vapor pressure such as methanol is used, drying at low temperatures can be employed.

At this drying step, evaporation of alcohol component and water proceeds from the matrix component, and bonds of Si—O—Ti become strong to form a network of silicon oxide-titanium oxide and the matrix has a high refraction rate. As a result, mismatching of refraction rate between the titanium oxide crystal grains and the matrix is reduced and transparency increases.

FIG. 1 shows a diagrammatic view of a photograph of a transmission electron microscope of glass obtained by the above-described manufacturing method. Photography was conducted by a transmission type electron microscope HF-2000 type TEM (manufactured by Hitachi High-Technologies Corporation). An analysis of composition was conducted by an energy dispersive X-ray spectrometer EDX, which is an accessory to the TEM. A spatial resolution magnitude was set to about 1 nm.

Since the transmission type electron microscope photograph shown in FIG. 1 shows a cross section of a specimen, grains formed at the time of cutting for a TEM specimen preparation may be included. Taking into consideration this phenomenon, a grain size distribution was measured by means of an intercept method (See M. I. Mendelson, J. Am. Ceram. Soc., 52, [8], 443-446 (1969)). The number of measured gains was 200 or more.

Further, a volumetric ratio of grains was calculated from the TEM photograph shown in FIG. 1. The TEM photograph shows a cast image of grains existing in a length of specimen of about 100 nm; since the thickness of the specimen is sufficiently thin, the volumetric ratio is similar to the area ratio. Accordingly, an area ratio of grains in the image is calculated, and the result was multiplexed by 3/2 power to calculate a volumetric ratio. In addition, a molar ratio was calculated from a density of grains and a molecular weight.

The glass produced by the above-described method was constituted an amorphous matrix 1 and crystal grains 2 dispersed in the matrix. The portion of amorphous matrix 1 was subjected to a composition analysis by DEX. The composition was $50SiO_2$-$50TiO_2$ (mol %). A molar ratio of the crystal grains estimated from the TEM photograph was about 30 mol %. An average grain size calculated by the intercept method was 10 nm. It was revealed that a grain size of the crystal grains at the time of addition was maintained. According to an electron beam reflection, it was revealed that the grains were rutile type titanium oxide, and a hallow pattern of the matrix showing amorphous was obtained.

Accordingly, the optical glass obtained in example 1 was a transparent bulk body having an amorphous matrix of silicon oxide-titanium oxide and rutile type titanium oxide crystal grains.

Though not shown in example 1, when anatase type titanium oxide grains were used, the anatase type crystal grains were precipitated as they were. Even the anatase type titanium oxide was used, a high refraction rate was obtained.

Example 2

Then, optical characteristics (transmittance, refraction rate, reflection rate, and decay coefficient) of the optical glass obtained in example 1 were evaluated.

Figure 2:
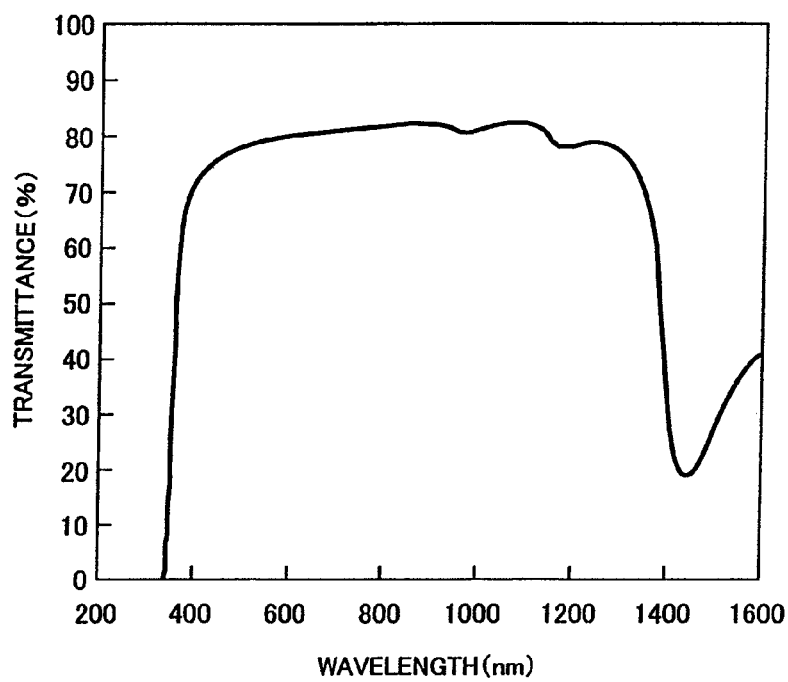
FIG. 2 is a graph showing a spectral transmittance curve of optical glass of the example.
Figure 3:
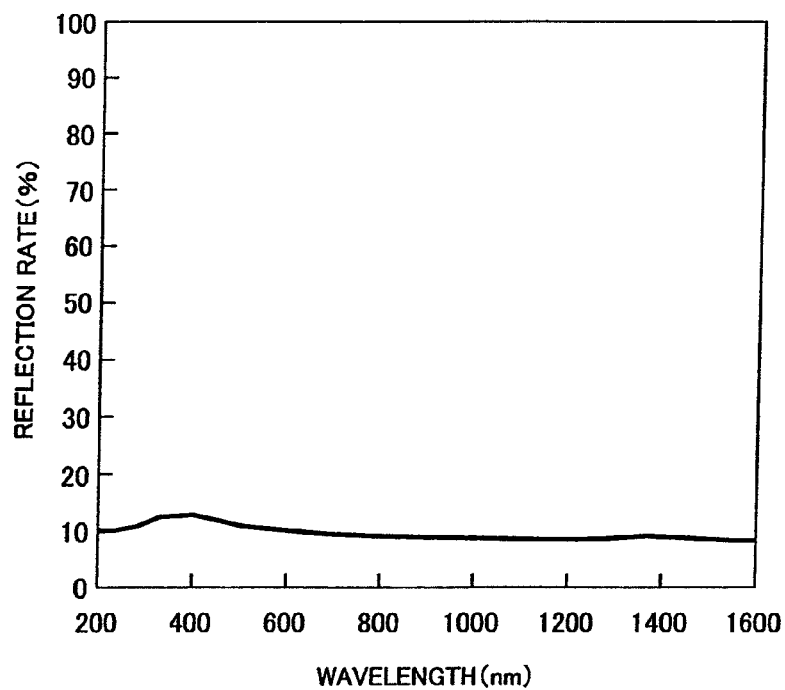
FIG. 3 is a graph showing a spectral refraction rate curve of the optical glass of the example of the present invention.

At first, the bulk optical glass obtained in example 1 was machined into 1.0 mm thick, and both faces of the slice were polished into mirror face. A transmittance thereof was measured. A reflection rate was measured by polishing the measure face to an optical mirror; roughening the rear face with #400 polishing paper; and measuring refraction from the rear face. An absorption spectrophotometer (U-4200 manufactured by Hitachi High-Technologies Corporation) was used to measure the refraction rate. A measure range of wavelength was 200 nm to 1600 nm. FIG. 2 shows the transmittance and FIG. 3 shows the refraction rate.

The transmittance in a visible wavelength range of 380 nm to 780 nm was 70 to 80%, which is sufficiently high even a loss by refraction is reduced. According to FIG. 3 showing reflection rate, the reflection rate was about 9.7% over any wavelength, which was sufficiently high.

Then, a refraction rate and decay coefficient of the optical glass were measured by using a rotation compensation type high speed spectroscopic ellipsometer M-2000 (manufactured by J. A. Woolam Co., Inc.). An incident angle was 70 degrees and 75 degrees, and a measurement wavelength was 200 nm to 1600 nm. In measuring the refraction rate a measurement face was an optical mirror face and a rear face was roughened with a #400 polishing paper to suppress refraction from the rear face.

Figure 4:
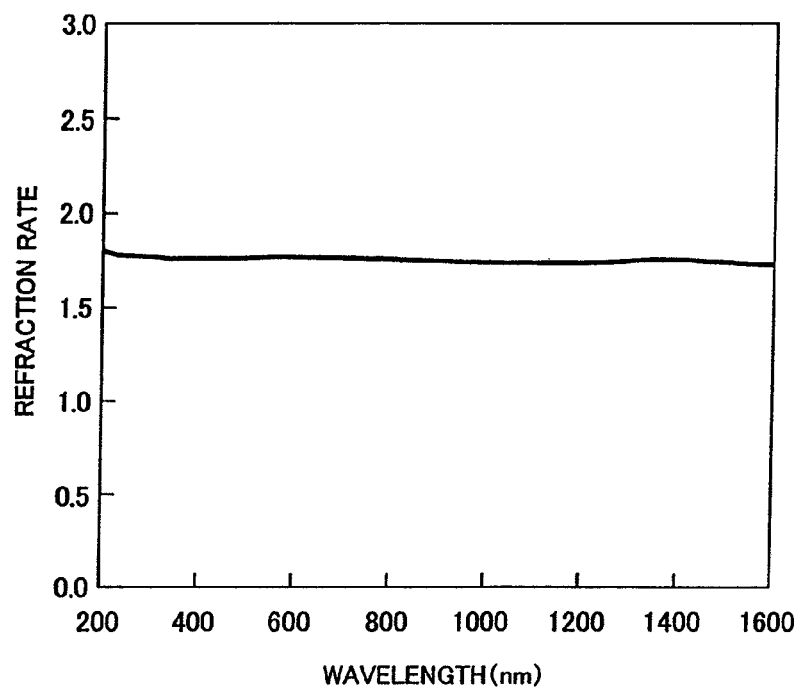
FIG. 4 is a graph showing dependency of refraction rate the optical glass of the example of the present invention on wavelength of light.
Figure 5:
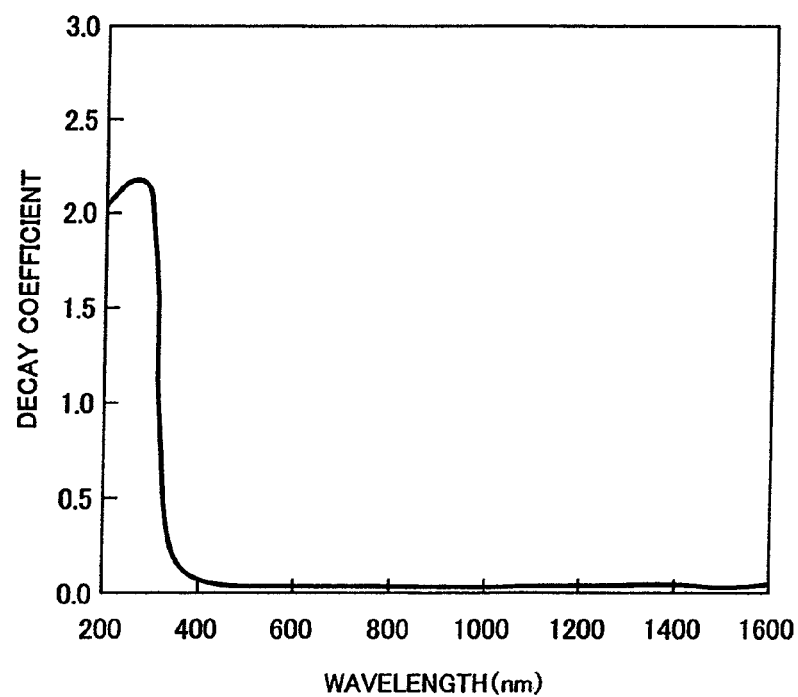
FIG. 5 is a graph showing dependency of absorption decay of the optical glass of the example of the present invention on wavelength of light.

The results are shown in FIGS. 4 and 5 wherein the refraction rate was about 1.76 over any wavelengths, and the decay coefficient was 0.1 or less over wavelength of 500 nm or longer, but the coefficient somewhat increased over a wavelength of 500 nm or less, and the value was about 0.3 at 380 nm. The decay coefficient greatly increased over short wavelengths of ultraviolet area.

According to the above facts, it was revealed that the glass prepared in example 1 had high refraction rate and transparency.

Example 3

Next, changes of optical characteristics of the amorphous matrix glass with respect to the composition of silicon oxide-titanium oxide were investigated. Various amorphous matrixes were prepared by changing ratios of silicon oxide-titanium oxide without adding titanium oxide crystal grains. Methods of preparation were the same as in example 1, except addition of the crystal grains not added. Table 1 shows compositions (mol %) of matrix glass, refraction rate ($n_D$) at sodium D line, decay coefficient ($k_D$), Abbe's number ($v_D$), transmittance ($T_D$) and reflection rate ($R_D$).

TABLE 1

| Specimen No. | Composition (mol %) | | $n_D$ | $k_D$ | $v_D$ | $T_D$ | $R_D$ | gelation |
|---|---|---|---|---|---|---|---|---|
| | $SiO_2$ | $TiO_2$ | | | | | | |
| 1 | 100 | 0 | 1.45 | 0.01 | 68 | 92.9 | 3.5 | ○ |
| 2 | 95 | 5 | 1.50 | 0.01 | 56 | 92.1 | 3.9 | ○ |
| 3 | 83 | 17 | 1.57 | 0.01 | 49 | 90.2 | 4.9 | ○ |
| 4 | 75 | 25 | 1.61 | 0.01 | 41 | 88.9 | 5.6 | ○ |
| 5 | 69 | 31 | 1.65 | 0.01 | 36 | 87.9 | 6.0 | ○ |
| 6 | 50 | 50 | 1.76 | 0.01 | 32 | 84.8 | 7.6 | ○ |
| 7 | 39 | 61 | 1.83 | 0.01 | 25 | 83.0 | 8.5 | ○ |

TABLE 1-continued

| Specimen No. | Composition (mol %) | | $n_D$ | $k_D$ | $v_D$ | $T_D$ | $R_D$ | gelation |
|---|---|---|---|---|---|---|---|---|
| | $SiO_2$ | $TiO_2$ | | | | | | |
| 8 | 29 | 71 | 1.89 | 0.01 | 23 | 81.4 | 9.3 | ○ |
| 9 | 27 | 73 | 1.90 | 0.01 | 22 | 81.1 | 9.5 | ○ |
| 10 | 20 | 80 | 1.94 | 0.01 | 21 | 80.0 | 10.0 | ○ |
| 11 | 18 | 82 | — | — | — | — | — | X (white milky) |

The specimen Nos. 1-10 were homogeneous transparent gel. The specimen Nos. 1-11 exhibited that as the amount of $TiO_2$ content increases, the refraction rate increased. Specimen No. 10 that contains $TiO_2$ in an amount of 80 mol % exhibited a value of $n_D$ as large as 1.94. However, specimen No. 11 that contains 82 mol % showed milky precipitate of $TiO_2$ and non-transparent gel.

Accordingly, the amount of titanium oxide in the amorphous matrix was preferably 80 mol % or less on the basis of a conversion to titanium oxide. If the amount of titanium oxide exceeds 80 mol %, glass turns milky and becomes non-transparent.

Example 4

Change of optical characteristics caused by adding titanium oxide crystal grains to the matrix glass was investigated. Specimen Nos. 1, 4, 5, 6 and 10 were amorphous matrix. $TiO_2$ crystal grains were added to the matrix glass in the manner of example 1.

$TiO_2$ crystal grains were prepared by the following manners. 10 g of methanol and 46 g of water were mixed, and 1 g of nitric acid was added to the mixture to adjust pH to about 1.2. 5 g of isopropoxide titanium was dropped to the methanol solution under vigorous stirring of the solution, and the mixture was stirred for 24 hours at 50° C. to carry out peptization treatment (treatment for re-dissolution). As a result, $TiO_2$ grains dispersed in the solution. An average grain size was 10.5 nm, and the standard deviation was 2.5 nm. $TiO_2$ grains were contained in the solution in an amount of about 30 wt %. When the crystalline phase of the crystal grains was identified by an X-ray diffraction method, the crystal phase was rutile type titanium oxide.

A grain size distribution was measured by a dynamic light scattering laser-Doppler method. A measurement instrument used was Microtrac Model 9340-UPA (manufactured by Nikkiso Co., Ltd.). A laser wavelength for measurement was 780 nm, and an output at the laser emitter was 3 mW. A grain size distribution of a range of 3.2 nm to 6.4 nm can be measured by this method.

The rutile type $TiO_2$ crystal grains were dispersed in the $SiO_2$—$TiO_2$ matrix shown in Table 1. Table 2 shows compositions of matrixes of glass, amounts of added crystal grains (mol %), color and transparency observed with eyes, refraction rate ($n_D$) by sodium D line, transmittance ($T_D$) and reflection rate ($R_D$). In Table 2, the added amounts were molar numbers of crystal nano-grains per the total molar number of the matrix glass and added crystal nano-grains.

TABLE 2

| Specimen No. | Composition of matrix (mol %) | | $TiO_2$ Additive amount (mol %) | Color | Transparency | $n_D$ | $T_D$ (t = 1.0 mm) | $R_D$ |
|---|---|---|---|---|---|---|---|---|
| | $SiO_2$ | $TiO_2$ | | | | | | |
| 12 | 100 | 0 | 1 | Transparent | ○ | 1.49 | 92.2 | 3.9 |
| 13 | 100 | 0 | 5 | " | ○ | 1.54 | 91.1 | 4.5 |
| 14 | 100 | 0 | 10 | " | ○ | 1.59 | 89.6 | 5.2 |
| 15 | 100 | 0 | 30 | Milky | X | — | 32.4 | 6.1 |
| 16 | 100 | 0 | 50 | White | X | — | 11.3 | 7.4 |
| 17 | 100 | 0 | 60 | " | X | — | 2.4 | 7.9 |
| 18 | 75 | 25 | 1 | Transparent | ○ | 1.65 | 88.0 | 6.0 |
| 19 | 75 | 25 | 5 | " | ○ | 1.69 | 86.9 | 6.6 |
| 20 | 75 | 25 | 10 | " | ○ | 1.74 | 85.5 | 7.2 |
| 21 | 75 | 25 | 30 | " | ○ | 1.93 | 79.9 | 10.0 |
| 22 | 75 | 25 | 50 | Milky | X | — | 43.1 | 8.0 |
| 23 | 75 | 25 | 60 | White | X | — | 20.3 | 8.1 |
| 24 | 69 | 31 | 1 | Transparent | ○ | 1.66 | 87.7 | 6.1 |
| 25 | 69 | 31 | 5 | " | ○ | 1.70 | 86.6 | 6.7 |
| 26 | 69 | 31 | 10 | " | ○ | 1.75 | 85.3 | 7.4 |
| 27 | 69 | 31 | 30 | " | ○ | 1.94 | 79.7 | 10.1 |
| 28 | 69 | 31 | 50 | " | ○ | 2.13 | 74.1 | 13.0 |
| 29 | 69 | 31 | 60 | " | ○ | 2.22 | 71.3 | 14.4 |
| 30 | 50 | 50 | 1 | " | ○ | 1.77 | 84.6 | 7.7 |
| 31 | 50 | 50 | 5 | " | ○ | 1.80 | 83.6 | 8.2 |
| 32 | 50 | 50 | 10 | " | ○ | 1.84 | 82.4 | 8.8 |
| 33 | 50 | 50 | 30 | " | ○ | 2.01 | 77.4 | 11.3 |
| 34 | 50 | 50 | 50 | " | ○ | 2.18 | 72.5 | 13.8 |
| 35 | 50 | 50 | 60 | " | ○ | 2.26 | 70.0 | 15.0 |
| 36 | 20 | 80 | 1 | " | ○ | 1.95 | 79.4 | 10.3 |
| 37 | 20 | 80 | 5 | " | ○ | 1.97 | 78.6 | 10.7 |
| 38 | 20 | 80 | 10 | " | ○ | 2.01 | 77.6 | 11.2 |
| 39 | 20 | 80 | 30 | " | ○ | 2.14 | 73.7 | 13.2 |
| 40 | 20 | 80 | 50 | " | ○ | 2.27 | 69.8 | 15.1 |
| 41 | 20 | 80 | 60 | " | ○ | 2.34 | 67.9 | 16.0 |

The color and transparency were evaluated by observation of appearance of dried gel sliced into 11.0 mm, the both faces thereof having been polished into an optical mirror. In evaluation of transparency X represents cloud or strong white milky color so that a white light source could not see when the light source is seen through the 1 mm thick specimen. ○ represents no cloud nor milky color.

The refraction rate at sodium D line was measured at a wavelength of 589.3 nm, which is the same to that of sodium D line, by means of the rotation compensation type spectroscopic ellipsometer M-2000 type high speed spectroscopic Ellipsometer (manufactured by J.A. Woollam Co., Ltd.) An incident angle was 65 degrees, 70 degrees and 75 degrees, respectively. In measuring the refraction rate the measurement face of the specimen was polished into an optical mirror, and the rear face was polished with #400 polishing paper in order to suppress reflection from the rear face. The measurement of the reflective rate was conducted using a dried gel slice of 1 mm thick, and the both faces were polished into an optical mirror, and the rear face was polished with #400 polishing paper to roughen the rear face so as to suppress reflection in the rear face. The refraction rate and reflection rate were measured by the spectroscopic photometer U-4200 (manufactured by Hitachi, Ltd.), wherein a wavelength of a light source was set to 689.3 nm, which is a sodium D line.

the additive amount is 50 mol % or more, the refraction rate was as large as 2.13 or more. Similarly, as shown in specimen Nos. 30-41, when the additive amounts of $TiO_2$ increase, the transparency was maintained even when the additive amounts were increased. Glass having a refraction rate as large as 2.0 or more was obtained.

From the above results, when optical glass is manufactured by the amorphous matrix containing silicon and titanium, 10% of $TiO_2$ crystal grains amount of $TiO_2$ could be added. In case of the matrix made of silicon only, addition of 10% of $TiO_2$ makes glass white milky. Further, when an amount of titanium oxide in the matrix is 31 mol % or more on the basis of a conversion to oxide of $TiO_2$, desired amounts of $TiO_2$ crystal grains could be mixed at desired ratios. When the amount of $TiO_2$ oxide in the matrix is less than 30 mol %, the glass may turn white milky depending on the additive amounts of $TiO_2$ so that optical characteristics may be lost.

Example 5

A grain size of TiO2 crystal grains was investigated. A composition of the matrix was set to $50SiO_2$-$50TiO_2$ (mol %). To the matrix added were 30 mol % of rutile type $TiO_2$ crystal grains having different grain sizes to prepare glasses. Table 3 shows the results of evaluation. The average grain sizes of $TiO_2$ crystal grains were changed from 3 nm to 22 nm. The evaluation was conducted in the same manner as in Table 2.

TABLE 3

| Specimen No. | Matrix composition (mol %) | | $TiO_2$ nano-grains | | color | Trans-parency | $n_D$ | $T_D$ (t = 1.0 mm) | $R_D$ |
|---|---|---|---|---|---|---|---|---|---|
| | $SiO_2$ | $TiO_2$ | Amount (vol %) | Average grain size (nm) | | | | | |
| 42 | 50 | 50 | 30 | 3 | Transparent | ○ | 1.81 | 83.4 | 8.3 |
| 43 | 50 | 50 | 30 | 4 | " | ○ | 1.95 | 79.3 | 10.4 |
| 44 | 50 | 50 | 30 | 5 | " | ○ | 2.01 | 77.4 | 11.3 |
| 45 | 50 | 50 | 30 | 6 | " | ○ | 2.02 | 77.2 | 11.4 |
| 46 | 50 | 50 | 30 | 7 | " | ○ | 2.00 | 77.8 | 11.1 |
| 47 | 50 | 50 | 30 | 10 | " | ○ | 2.02 | 77.2 | 11.4 |
| 48 | 50 | 50 | 30 | 15 | " | ○ | 2.03 | 76.9 | 11.6 |
| 49 | 50 | 50 | 30 | 18 | " | ○ | 2.03 | 76.9 | 11.6 |
| 50 | 50 | 50 | 30 | 20 | " | ○ | 2.05 | 76.3 | 11.9 |
| 51 | 50 | 50 | 30 | 22 | " | X | 2.01 | 42.5 | 11.5 |

In Table 2 the specimen Nos. 12-17 were made of a matrix of $SiO_2$ only and $TiO_2$ crystal grains dispersed in the matrix. Although when additive amounts of $TiO_2$ crystal grains were 1-5%, transparent gel was obtained, when the additive amount exceeded 10%, the resulting gel was milky. The refraction was 1.59 when 10% of $TiO_2$ was added, but the refraction was not as high as 2.0. From the above results, when the matrix is made of 100% of $SiO_2$, it was revealed that optical glass with a high refraction rate and high transparency was difficult to produce even when $TiO_2$ crystal grains are added.

Similarly, the specimen Nos. 18-23 wherein $TiO_2$ crystal grains were added to the matrix were evaluated. Refraction rates of the glass were higher than the glass made of $SiO_2$ matrix, and an amount of $TiO_2$ crystal grains could be made large. Although transparent gel was obtained until the added amount of $TiO_2$ was 30 mol %, it was difficult to maintain the high transparency when the additive amount exceeds 30 mol %. When the additive amount of $TiO_2$ was 30 mol %, the refraction rate was as large as 1.93, but it was not as large as 2.0.

As shown in specimen Nos. 24-29, glass in which 31 mol % of $TiO_2$ was added maintained at any additive amounts. When The average grain size should preferably be 3 nm or more. $TiO_2$ crystal grains having an average grain size of less than 3 nm were not used because they are instable, and tend to aggregate.

Further, when an average grain size of $TiO_2$ crystal grains is 5 nm or more, a refraction ratio was as high as 2.0 or more. Accordingly, the average grain size of $TiO_2$ should preferably be 5 nm or more.

As shown in specimen No. 51, if the average grain size exceeds 20 nm, the glass became milky and transparency was lost. When the average grain size of $TiO_2$ crystal grains was 3 to 20 nm, transparency was good. Accordingly, the average grain size should be 20 nm or less.

From the above results, the average grain size of the added titanium oxide crystal grains should preferably be 3 to 20 nm, particularly, 5 nm to 20 nm. If the average grain size of the titanium oxide crystal grains is less than 3 nm, titanium oxide crystal grains tend to aggregate, and are instable. If the average grain size of titanium oxide crystal grains is less than 5 nm, a sufficiently high refraction rate is not obtained. If the average grain size exceeds 20 nm, optical glass may turn white milky, which is not preferable.

Example 6

Investigated were changes of optical characteristics of the matrix glass to which silicon crystal grains were added. The compositions prepared in example 3 were amorphous matrixes and silicon crystal grains were added in accordance with methods in example 1.

The silicon crystal grains were prepared by the following manner. After a silicon raw material was put in high temperature plasma to decompose the material into elements, the resulting products were rapidly cooled using carrier gas to the liquid nitrogen temperature to produce nano-silicon grains. The grains were introduced into a reactor tube and subjected to aging to produce crystal silicon nano-grains. The silicon nano-grains of 10 to 30 vol % can be used in the form of dispersion in a solvent such as methanol, tetrahydrofuran, dimethyl formamide, etc. The silicon crystal grains (Si) were dispersed in the $SiO_2$—$TiO_2$ matrixes shown in Table 1. Table 4 shows compositions of matrixes of glass, additive amounts of crystal grains (mol %), color and transparency observed with eyes, refraction rate ($n_D$) at sodium D line, transmittance ($T_D$), reflection rate and ($R_D$). In example 6 shown in Table 4 the average grain size of the Si nano-grains was 6 nm. In Table 4 the additive amounts of the silicon crystal grains are molar numbers of the added grains with respect to the total molar numbers of the matrix glass and the added crystal grains. Other evaluation results are the same as in Table 2.

TABLE 4

| Specimen No. | Composition of matrix (mol %) | | Additive amount (mol %) | color | Trans-parency | $n_D$ | $T_D$ (t = 1.0 mm) | $R_D$ |
| --- | --- | --- | --- | --- | --- | --- | --- | --- |
| | $SiO_2$ | $TiO_2$ | | | | | | |
| 6 | 50 | 50 | 0 | Transparent | ○ | 1.76 | 84.8 | 7.6 |
| 52 | 50 | 50 | 1 | " | ○ | 1.78 | 84.1 | 7.8 |
| 53 | 50 | 50 | 5 | " | ○ | 1.92 | 83 | 8.4 |
| 54 | 50 | 50 | 20 | " | ○ | 2.02 | 82 | 9 |
| 55 | 50 | 50 | 40 | " | ○ | 2.21 | 76.8 | 11.8 |
| 56 | 50 | 50 | 50 | " | X | 2.25 | 70.1 | 14.2 |
| 57 | 50 | 50 | 60 | " | X | 2.34 | 65.2 | 16 |

In Table 4, evaluation results of specimen Nos. 52-57 wherein 50 mol % of $TiO_2$ is contained in the matrixes. By addition of silicon crystal grains, it has been revealed that as the same as in addition of titanium oxide crystal grains, high refraction rate can be achieved. When the additive amount of silicon crystal grains is 40 mol % or less, transparent glass was obtained, but when it exceeds 40 mol %, gel turned brown and transparency was reduced, which is not preferable.

According to the above results, it has been revealed that when silicon crystal grains, transparency was good and refraction rate was high if the additive amount was 1 mol % to 40 mol %.

Example 7

A grain size of the dispersed silicon (Si) crystal grains was investigated. The composition of the matrix was $50SiO_2$-$50TiO_2$ (mol %) and glass containing 30 mol % of silicon crystal grains having different grain sizes was prepared. Table 5 shows the results of investigation. The average grain sizes were changed from 3 nm to 10 nm. The evaluation methods are the same as in Table 4.

TABLE 5

| Specimen No. | Matrix composition (mol %) | | Si crystal grain | | color | Trans-parency | $n_D$ | $T_D$ (t = 1.0 mm) | $R_D$ |
| --- | --- | --- | --- | --- | --- | --- | --- | --- | --- |
| | $SiO_2$ | $TiO_2$ | Additive amount (mol %) | Average grain size (nm) | | | | | |
| 6 | 50 | 50 | 0 | — | Transparent | ○ | 1.76 | 84.8 | 7.6 |
| 58 | 50 | 50 | 30 | 3 | " | ○ | 1.91 | 83 | 8.3 |
| 59 | 50 | 50 | 30 | 4 | " | ○ | 2 | 78.2 | 9.1 |
| 61 | 50 | 50 | 30 | 6 | " | ○ | 2.15 | 76.2 | 12.2 |
| 63 | 50 | 50 | 30 | 8 | " | ○ | 2.22 | 69.5 | 14.3. |
| 64 | 50 | 50 | 30 | 10 | Brown | X | 2.34 | 60.2 | 16.1 |

It is preferable that the average grain size of silicon crystal grains is 3 nm or more. Since if the average grain size of silicon crystal grains is smaller than 3 nm, the grains are instable and aggregation took place, they were not used.

If the average grain size of silicon crystal grains is 4 nm or more, a refraction rate as high as 2.0 or more was obtained. Accordingly, the average grain size of 4 nm or more is preferable.

As shown in specimen No. 64, when the average grain size exceeds 8 nm, the glass turned white milky and transparency was lost. When the average grain size was 3 nm to 8 nm, transparency was good. Accordingly, the grain size should preferably be 8 nm or less.

From the above, the average grain size of added silicon crystal grains should preferably be 3 nm to 8 nm, particularly 4 nm to 8 nm. If the grain size of silicon crystal grains is less than 3 nm, remarkable aggregation of the grains takes place, and instable. On the other hand, if the average rain size is over 8 nm, optical glass turns white milky and transparency thereof becomes insufficient. In addition if the average grain size of titanium oxide crystal grains is less than 4 nm, an increase in refraction rate may be insufficient. Further, if the average grain size is over 8 nm, the optical glass turns white milky and transparency becomes insufficient.

In examples 1-7 silicon oxide-titanium oxide as the matrix and titanium oxide or silicon as crystal grains dispersed in the matrix have been explained. These technologies can be applied to amorphous matrixes constituted by oxides that become glassy or vitreous and oxides that become glass with high refraction rate when they are added to the glass. Examples of oxides that become glassy are phosphor oxide, boron oxide, etc besides silicon oxide. Since boron oxide has a low refraction rate, silicon oxide and/or phosphor oxide are preferable for applications that need high refraction rate.

Crystal grains for achieving high refraction rate of the glass matrix include oxides of 4B group elements such as zirconium oxide, hafnium oxide and oxides of rare earth elements such as lanthanum oxide, cerium oxide. For the applications of optical glass, oxides having small light absorption to visible light are preferable. As the oxides of rare earth elements there are oxides of gadolinium, ytterbium, thulium, terbium, dysprosium, holmium, ruthenium. Among the above oxides the heavy metal oxides make a density of the glass large, and hence other than heavy metal oxides are preferable for minute optical lens parts, etc so that lens can be light-weight. Barium oxide and bismuth oxide, etc may be used. However, since these elements are recognized as environmental hazardous substance, it is necessary to use them with care. Taking into consideration light-weight and environment load, titanium oxide and zirconium oxide with high refractive are particularly suitable for constituting the matrix.

Zirconium oxide as a crystal grains dispersed in the matrix can be substituted with other oxides with high refraction rate such as zirconium. In the above examples rutile type crystal is shown, but anatase type crystal has the same effect.

Example 8

The following example shows nano-grains having shall of silicon oxide on silicon nano-grains prepared in examples 6 and 7, the shell having a concentration gradient of oxygen.

The silicon crystal grains to be added were prepared in the same manner as in example 6. After a silicon raw material was put into a high temperature plasma to thereby decompose the material into elements, the products were rapidly cooled by carrier gas to the liquefied nitrogen temperature to produce silicon nano-grains. Then, the silicon grains were introduced into a reactor tube to subject them to aging at 600° C. to produce crystal silicon nano-grains. The grains were dispersed in an amount of 10 to 30 vol % in a solvent such as methanol, tetrahydrofuran, dimethyl formamide, etc.

In the following there is explained a method for forming the concentration gradient of oxygen by a sol-gel method thereby to disperse silicon nano-grains in the silicon oxide-titanium oxide matrix.

In this example as a precursor of silicon oxide for the matrix, tetramethyl orthosilicate ($Si(OCH_3)_4$; TMOS) was used. As a precursor of titanium oxide, tetraisopropyl titanate ($Ti(OC_3H_7)_4$) was used. As a solvent, dimethyl formamide was used.

To 1 mol of tetramethyl orthosilicate added was 1 mol of dimethyl formamide to dilute them, and thereafter 1 mol of water was added to effect hydrolysis of one methoxyl groups of tetraisopropyl titanate was hydrolyzed to obtain the solution E. After 1.6 mol of tetraisopropyl titanate was diluted with 3.2 mols of dimethyl formamide, the mixture was added to the solution E to obtain the solution F. To the solution F added was water equivalent to 0.6 mol to hydrolyze a part of tetraisopropyl titanate to obtain the solution G.

It may be possible to add tetrahydrofuran to the solution G thereby to increase an amount of titanium contained in the matrix. In this case the molar ratio of titanium can be added by 95 mol %. If the titanium is added more than that, titanium is preferentially gelled at the time of final hydration to turn white milky. The solution whose amount of titanium is increased is called the solution H.

A predetermined silicon nano-grains dispersed in a predetermined hydrofuran was added to the solution G or solution H to obtain a solution I. Added was remaining water to the solution I to effect gelation, and before the solution loses flowability, it was charged into a mold to form gel. After forming, dimethyl formamide was dropped onto the gel to strengthen the structure of the gel, while preventing cracks in the gel and suppressing rapid evaporation of the solvent. The aging was conducted for about one day.

After aging processing, dimethyl formamide was removed and it was dried in a closed vessel at room temperature. Further, it was dried at 70° C. in a dryer to remove the solvent, alcohol, etc contained in the gel. In addition, drying at 160° C. in a dryer was carried out to evaporate dimethyl formamide. At this step, since the silicon nano-grains had a large grain size, the gel was brown because of light absorption and scattering by the grains.

The gel was further subjected to heat treatment at 300° C. for 10 hours to form a layer of oxygen diffusion on the silicon nano-grains and miniaturize the silicon nano-grains so that light absorption and light scattering become small to improve transparency of the gel as a whole.

The silicon (Si) crystal grains were dispersed in the $SiO_2$—$TiO_2$ matrix shown in Table 1. In this example the composition of the $SiO_2$—$TiO_2$ matrix was $32SiO_2$-$68TiO_2$ (mol %), and silicon nano-grains having the average grain sizes of 10 nm were dispersed. As described above, the surface of the silicon nano-grains was oxidized by the heat treatment to change the color of the gel. Heating time at 300° C. was changed to evaluate transparency, color, refraction rate, transmittance and reflection rate of the gel. A specimen for transmission electron microscope was prepared from the heat-treated gel. An average grain size of the silicon nano-grains was calculated from the electron microscope image. It was confirmed that the precipitated grains were Si by an electron diffraction pattern and lattice image. Table 6 shows the result of evaluation.

TABLE 6

| Specimen No. | Matrix composition (mon %) SiO$_2$ | Matrix composition (mon %) TiO$_2$ | Added Si grain Additive amount (mol %) | Added Si grain Grain size (nm) | Heating time | Si grain size (nm) | color | Trans-parency | $n_D$ | $Y_D$ (t = 1.0 mm) | $R_D$ |
|---|---|---|---|---|---|---|---|---|---|---|---|
| 65 | 50 | 50 | 30 | 10 | 0 | 10 | Brown | X | 2.32 | 60.4 | 16.0 |
| 66 | 50 | 50 | 30 | 10 | 4 | 9 | Light brown | X | 2.3 | 60.2 | 15.8 |
| 67 | 50 | 50 | 30 | 10 | 8 | 8 | Transparent | ○ | 2.21 | 69.8 | 14 |
| 68 | 50 | 50 | 30 | 10 | 16 | 6 | " | ○ | 2.14 | 76.4 | 12.1 |
| 69 | 50 | 50 | 30 | 10 | 24 | 3 | " | ○ | 1.92 | 84 | 8.2 |
| 70 | 50 | 50 | 30 | 10 | 48 | 0 | " | ○ | 1.77 | 85.2 | 7.4 |

The specimen Nos. 65 and 66 wherein the heating time was 0.4 hour had brown color, and transparency and transmittance were low. The specimen No. 65 used an alkoxide material, which is different from that shown in Table 5, and the optical characteristics are slightly different. The transmission electron microscope photograph shows that amorphous oxide layer, which has a different contrast from the matrix, was formed.

It was revealed that when the heating time was prolonged, transparency was improved. Especially, when the heating time was 8 hours to 24 hours, residual silicon nano-grains became 3 nm to 8 nm, and the gel showed high refraction rate and high transparency. This result coincided with FIG. 5 of example 7. When the heating time is 48 hours, the silicon nano-grains were oxidized entirely. Therefore, though the transparency was sufficient, the refraction rate was insufficient.

According to analysis by the transmission electron microscope, when silicon nano-grains having a large grain size are added, followed by heat treatment to make the grain size smaller, an oxide layer was formed on the surface of silicon. It was observed that the analysis of silicon oxide of the shell layer presented around the silicon nano-grains by the energy diffraction type luminescent X-ray analyzer, and the closer the shell to the core of the silicon grains, the lower the oxygen concentration was. Accordingly, the shell present on the silicon nano-grains, which was prepared by the above method, has a gradient of oxygen concentration, the oxygen concentration in the outer portion of the shell being higher than that in the inner portion.

When the silicon grains having no oxide layer thereon shown in example 7 are used, if the grain size is too small, homogeneous dispersion is difficult because of aggregation of the grains. If large silicon nano-grains are mixed in advance, and if the silicon nano-grains are heat-treated to oxidize the surface of the grains thereby to make the grain size smaller, light scattering is small and the aggregation is hard to take place so that a homogeneous dispersion is expected.

When specimen Nos. 58, 59 are compared with 63 and specimen Nos. 67, 68 and 69, the average grain sizes are the same and the refraction rates are almost the same, but the transmittance of the latter in Table 6 is larger. This is because the oxygen concentration in the silicon oxide layer near the core is low and the outer portion of the shell has a higher oxygen concentration, there is a gradient of refraction rate and sudden scattering of light is suppressed.

As having been described, a shell of silicon oxide layer should preferably be formed on the silicon nano-grains. Further, the oxygen concentration in the shell should preferably have a gradient, more preferably the oxygen concentration in the center portion is low as possible, and the outer portion is high as possible.

Example 9

Next, an organic-inorganic hybrid structure was formed as a part of the silicon oxide matrix, and its function was investigated. In this example the organic-inorganic hybrid was formed from dimethyl silane having two methyl groups are bonded to silicon. As a silicon oxide raw material dimethyl dichlorosilane was used. As a titanium oxide raw material isopropoxide titanium was used.

Dimethyl dichlorosilane was diluted with dimethyl formamide, and 1 equivalent of water was added to effect hydrolysis of chlorine component and to effect polymerization reaction of the silicon compound. Since chlorine reacted with hydrogen in water, the solution was of strong acidity. To the solution added was isopropoxide titanium to bond titanium oxide to ends of the polymer.

In this example raw materials were used so as to make a molar ratio of 50:50 of silicon to titanium, and, as same as in example 6, 30 mol % of silicon grains having a grain size of 4 nm was incorporated. As a result, the same gel as in example 6 was obtained. Though the refraction rate was 1.95, which was slightly lower than that containing no organic side chains, a high refraction rate was obtained. The transparency was as high as 76%. From the above results, it has been revealed that a matrix that contains organic side chains can be used. Other organic side chains than alkyl groups such as aminoalkyl groups, phenyl groups can be used to produce the similar gels.

What is claimed is:

1. Optical glass constituted by an amorphous matrix and crystal grains dispersed in the amorphous matrix, wherein main ingredients of the amorphous matrix are silicon oxide and titanium oxide, and the crystal grains comprise silicon, the crystal grains having an average grain size of 3 nm to 8 nm, wherein an amount of titanium in the amorphous matrix is 30 mol % to 80 mol % on the basis of a conversion to TiO$_2$, and the crystal silicon grains are contained in the glass in an amount of 1 mol % to 40 mol %.

2. Optical glass constituted by an amorphous matrix and crystal grains dispersed in the amorphous matrix, wherein the amorphous matrix includes main ingredients comprising at least one of silicon oxide and phosphorus oxide and at least one of titanium oxide and zirconium oxide, and the crystal grains comprise silicon, a grain of the crystal grains comprising a core having an average grain size of 3 nm to 8 nm and a shell, wherein the shell has such a concentration gradient of oxygen that a concentration increases from a portion of the shell adjacent the center of the grain to an outer portion.

3. Optical glass constituted by an amorphous matrix and crystal grains dispersed in the amorphous matrix, wherein the amorphous matrix includes main ingredients comprising at least one of silicon oxide and phosphorus oxide and at least one of titanium oxide and zirconium oxide, and the crystal grains comprise at least a core made of at least one of titanium oxide, zirconium oxide and silicon, the crystal grains having an average grain size of 3 nm to 20 nm, wherein the amorphous matrix includes main ingredients comprising silicon oxide and titanium oxide, the crystal grains comprise at least a core made of at least one of titanium oxide and silicon, the optical glass is transparent, the crystal grains comprise silicon, a grain of the crystal grains comprising a core having an average grain size of 3 nm to 8 nm and a shell, wherein the shell has such a concentration gradient of oxygen that a concentration increases from a portion of the shell adjacent the center of the grain to an outer portion.

4. Optical glass constituted by an amorphous matrix and crystal grains dispersed in the amorphous matrix, wherein the amorphous matrix includes main ingredients comprising at least one of silicon oxide and phosphorus oxide and at least one of titanium oxide and zirconium oxide, and the crystal grains comprise at least a core made of at least one of titanium oxide, zirconium oxide and silicon, the crystal grains having an average grain size of 3 nm to 20 nm, wherein the optical glass is transparent and has a refractive index of 2.0 or more.

5. Optical glass constituted by an amorphous matrix and crystal grains dispersed in the amorphous matrix, wherein main ingredients of the amorphous matrix are silicon oxide and titanium oxide, and the crystal grains comprise titanium oxide, the crystal grains having an average grain size of 3 nm to 20 nm, wherein the optical glass is transparent and has a refractive index of 2.0 or more.

6. Optical glass constituted by an amorphous matrix and crystal grains dispersed in the amorphous matrix, wherein main ingredients of the amorphous matrix are silicon oxide and titanium oxide, and the crystal grains comprise silicon, the crystal grains having an average grain size of 3 nm to 8 nm, wherein the optical glass is transparent and has a refractive index of 2.0 or more.

7. The optical glass according to claim 2, wherein the main ingredients of the amorphous matrix are at least silicon oxide and titanium oxide.

8. The optical glass according to claim 7, wherein at least one organic side chain is coordinated to the silicon oxide.

9. The optical glass according to claim 4, wherein the amorphous matrix includes main ingredients comprising silicon oxide and titanium oxide, the crystal grains comprise at least a core made of at least one of titanium oxide and silicon, and the optical glass is transparent.

10. The optical glass according to claim 9, wherein an amount of titanium in the amorphous matrix is 30 mol % to 80 mol % on the basis of a conversion to $TiO_2$, and the crystal grains are contained in the glass in an amount of 1 mol % to 60 mol %.

11. The optical glass according to claim 9, wherein at least one organic side chain is coordinated to the silicon oxide.

12. The optical glass according to claim 2, wherein the optical glass is transparent and has a refractive index of 2.0 or more.

* * * * *